United States Patent
Filosa et al.

(10) Patent No.: US 10,471,564 B2
(45) Date of Patent: Nov. 12, 2019

(54) RAIL PROCESSING DEVICE AND METHOD

(71) Applicant: S.P.D. S.p.A., Caravaggio (IT)

(72) Inventors: Giuseppe Filosa, Caravaggio (IT);
Giovanni Cosmai, Rescaldina (IT);
Matteo Cipolla, Cassina de'Pecchi (IT)

(73) Assignee: S.P.D. S.p.A., Caravaggio (IT)

( * ) Notice: Subject to any disclaimer, the term of this patent is extended or adjusted under 35 U.S.C. 154(b) by 99 days.

(21) Appl. No.: 15/897,407

(22) Filed: Feb. 15, 2018

(65) Prior Publication Data

US 2018/0237229 A1    Aug. 23, 2018

(30) Foreign Application Priority Data

Feb. 17, 2017    (IT) .................. 102017000018277

(51) Int. Cl.
*B23Q 39/02*    (2006.01)
*B23Q 3/15*    (2006.01)
(Continued)

(52) U.S. Cl.
CPC ............ *B23Q 39/028* (2013.01); *B23C 3/005* (2013.01); *B23Q 3/064* (2013.01); *B23Q 3/1543* (2013.01);
(Continued)

(58) Field of Classification Search
CPC ....... B23Q 3/15–3/1546; B23Q 39/028; B23Q 39/029; B23Q 2240/007; B23Q 3/064; B23Q 7/001; B25B 11/002; B25B 11/00; E01B 31/00; B24B 19/004; B23C 3/005; B23C 3/002; B23D 1/006; B23D 79/026; Y10T 409/50164; Y10T 29/5124; Y10T 29/50–52; B23K 2101/26
(Continued)

(56) References Cited

U.S. PATENT DOCUMENTS 1,036,977 A * 8/1912 Downes ................ B25B 11/002
269/8
1,704,448 A * 3/1929 Tracy ................... B23Q 3/1543
335/289

(Continued)

FOREIGN PATENT DOCUMENTS

DE    102016110185 A1 * 12/2016
EP    1321225 A2    6/2003
(Continued)

OTHER PUBLICATIONS

Machine Translation of JP 06-091419 A, which JP '419 was published Apr. 1994.*
Machine Translation DE 102016110185 A1, which DE '185 was published Dec. 2016.*

*Primary Examiner* — Erica E Cadugan
(74) *Attorney, Agent, or Firm* — King & Schickli, PLLC

(57) ABSTRACT

A rail processing device (1) comprising at least a first (3A) and a second work station (3B) provided on a common frame (30), and configured to alternately lock a rail (2) when the latter is being processed, each work station (3A, 3B) comprising at least a first magnetic anchorage plane (4) configured to cooperate with a web (2A) of the rail (2) when the latter is being processed in the respective station, and a transport system (50A, 50B) to move the rail (2) from the first work station (3A) to the second work station (3B) and vice versa.

17 Claims, 5 Drawing Sheets

(51) Int. Cl.
  *B23Q 7/00* (2006.01)
  *E01B 31/00* (2006.01)
  *B23C 3/00* (2006.01)
  *B25B 11/00* (2006.01)
  *B24B 19/00* (2006.01)
  *B23Q 3/06* (2006.01)
  *B23Q 3/154* (2006.01)

(52) U.S. Cl.
  CPC ............ *B23Q 3/1546* (2013.01); *B23Q 7/001* (2013.01); *B24B 19/004* (2013.01); *E01B 31/00* (2013.01); *B23C 2215/32* (2013.01); *B23Q 2240/007* (2013.01); *B25B 11/002* (2013.01); *Y10T 29/5124* (2015.01)

(58) Field of Classification Search
  USPC ..... 335/285–295; 269/8; 409/198, 221, 225; 29/560–650
  See application file for complete search history.

(56) References Cited

U.S. PATENT DOCUMENTS

| | | | | |
|---|---|---|---|---|
| 5,897,275 A | * | 4/1999 | Sella | .................... B23Q 15/225 |
| | | | | 408/13 |
| 6,039,517 A | * | 3/2000 | Charewicz | ............. B23Q 3/154 |
| | | | | 269/8 |
| 7,707,705 B2 | * | 5/2010 | Pleugel | ................... B23C 3/002 |
| | | | | 29/33 C |

FOREIGN PATENT DOCUMENTS

| | | | |
|---|---|---|---|
| EP | 2602038 A1 | | 6/2013 |
| FR | 2548945 A | * | 1/1985 |
| FR | 2986450 A1 | | 8/2013 |
| JP | 59-059329 A | * | 4/1984 |
| JP | 06-091419 A | * | 4/1994 |
| JP | 06-126576 A | * | 5/1994 |

\* cited by examiner

RAIL PROCESSING DEVICE AND METHOD

FIELD OF THE INVENTION

The present invention relates to a rail processing device and method.

More specifically, it refers to a device and a method configured to process a rail for use, in particular, in railway track switching or intersections.

BACKGROUND ART

At the state of the art, commonly known machinery exists for processing rails for the construction of rail track switching.

On these machines, different systems are used to lock the rail during processing thereof by means of a tool.

The oldest type of locking system is a mechanical/hydraulic system (manual brackets or hydraulically operated automatic brackets) and the most recent is a magnetic type. The mechanical/hydraulic systems have the peculiarity of offering very high anchoring forces, but—conversely—prevent good evacuation of machining chips due to the presence of oil distribution hoses and mechanical structures constituting bracket anchorage points or rail support points.

In said equipment, there is a high consumption of hydraulic oil (due to leaks) and maintenance is required almost continuously. Furthermore, the mechanical/hydraulic system poses the disadvantage of generating an anchoring force which is concentrated in individual points distributed along the rail. This may induce vibrations during processing (resulting in increased tool wear).

The magnetic systems, consisting mainly of two magnetic zones positioned in a mutually orthogonal fashion, anchor the rail in the lower part of the base section (or 'foot') and one of the two sides of the core section (i.e. the vertical portion connecting the foot and the head, better known as the 'web').

These systems do not feature pipelines or recesses, therefore they offer the possibility of excellent evacuation of chips generated during processing. This improves the cleaning and set-up operations for new parts to be processed.

Furthermore, the magnetic systems provide a continuous anchoring force along the entire length of the rail, thereby increasing system rigidity and reducing vibrations.

One disadvantage of the magnetic systems is that the anchoring forces generated are normally lower than those offered by traditional mechanical systems.

With said anchoring systems, therefore, it is necessary to reduce tool speed and travel (feed rate), especially when the processing concerns the rail head area and the forces are acting thereupon in the opposite direction to the abutment and magnetic anchorage surface. This is to prevent detachment of the rail from the abutment and anchorage point.

In other cases recourse is made to the use of mechanical systems (manual brackets), as an aid the magnetic ones, to prevent detachment. Nevertheless, said approach impairs efficiency, as the machine tool operator has to suspend processing operations in order to manually adjust the positioning/repositioning of the manual brackets if the presence of the latter interferes with the passage of the tool.

The object of the present invention is to provide a rail processing device and method which is improved compared with the prior art.

A further object of the present invention is to provide a rail processing device and method which reduces rail processing times.

This and other objects are achieved by means of a rail processing device and method according to the technical teachings of the claims annexed hereto.

BRIEF DESCRIPTION OF THE FIGURES

Further characteristics and advantages of the invention will become clearer in the description of a preferred but not exclusive embodiment of the device, illustrated—by way of a non-limiting example—in the drawings annexed hereto, in which.

DETAILED DESCRIPTION

Figure 1:
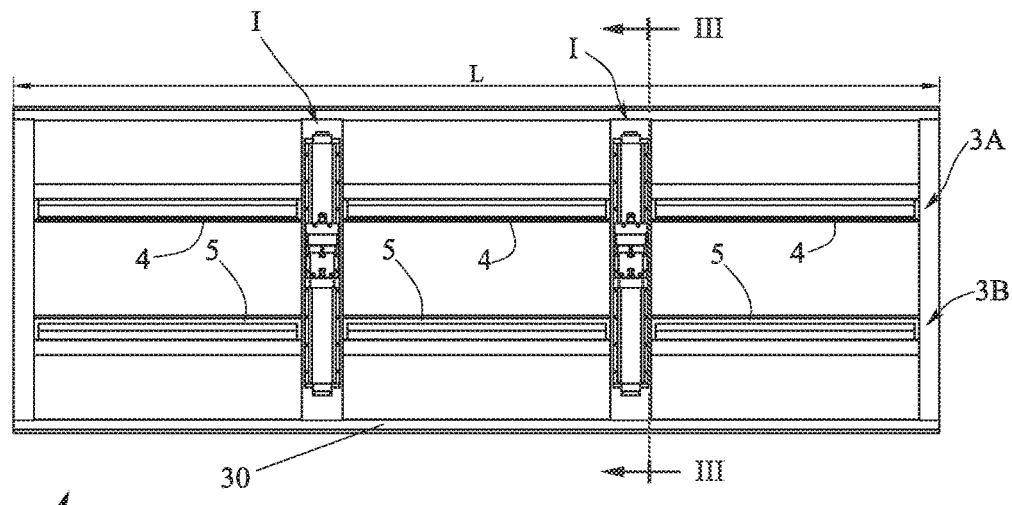
FIG. 1 is a simplified plan view of a device according to the present invention.
Figure 2:
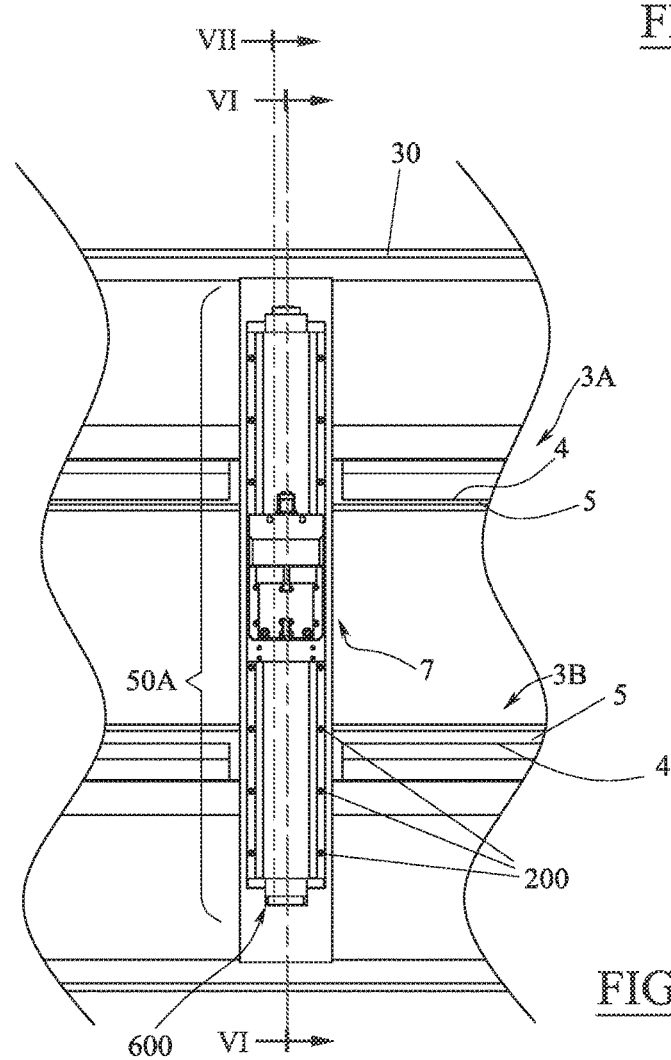
FIG. 2 is an enlargement of a detail of a transport system in the device in FIG. 1.

With reference to the cited figures, reference number 1 is used to denote, as a whole, a rail processing device. In particular, the device can process rails for use in railway track switching.

The rail processing device 1 comprises a structural frame 30 which may rest on the floor or on a suitable base by means of legs and feet 31. In particular, the processing device 1 may be a rail anchoring device designed for the mechanical processing of said rails.

On the frame a first 3A and a second work station 3B are positioned, facing each other, and designed to alternatively lock a rail 2 while the latter is being processed.

Essentially, the device 1 is conceived to process just one rail at a time, by means of one or more appropriately driven tools 6 which work on the rail when the latter is in the first work station or, alternatively, in the second. The tool 6 may be numerically controlled and it may be configured to process the rail both when it is in the first work station or in the second. Preferably, instead, tools 6 may be provided which are dedicated to either one or the other of the work stations 3A, 3B.

The device may be equipped with multiple tool types. For example, there may be milling cutters, grinding wheels, drills or other of tools of various kinds which are useful to process the rail 2.

The frame 30 may have a length L which comfortably accommodates most of the length of a rail 2, which may even be 30 m (or more).

More specifically, each work station 3A, 3B comprises at least a first magnetic anchorage plane 4 (preferably vertical) configured to cooperate with a web 2A (or foot) of the rail 2 when the latter is being processed in the respective station.

The first and second work stations may be positioned on the device 1 so that the respective first magnetic anchorage planes 4 are in front of one another (and are therefore mutually facing).

As can be seen in FIG. 1 (which—for description purposes—is extremely schematic and represents just one of the possible configurations of the device 1), the first anchoring plane 4 of each station is discontinuous, and may envisage spaces I housing a transport system 50A to move the rail 2 from the first work station 3A to the second work station 3B and vice versa.

In the configuration shown there are two transport systems which act in synchronised manner, but obviously further configurations may be possible with a greater number of transport systems (all of which may be identical) depending on the length of the rails to be processed with the device 1.

There may also be a different number of magnetic base frames (in this case, three), again, to adapt to the rail length and the clamping force necessary for the rail processing by the tool.

Also the transport system 50A which moves between the two stations is preferably associated to the frame 30 (for example by means of bolts 200), and supported thereby.

Figure 3A:
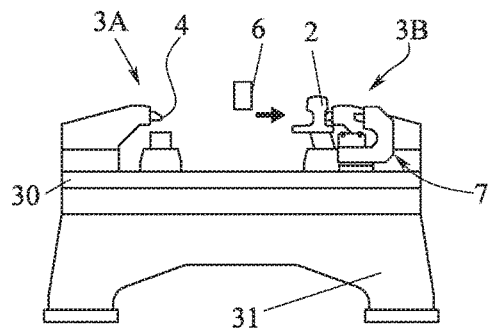
FIGS. 3A to 3E are simplified sections, taken along line III-III of FIG. 1, while the device takes on various operating configurations during a rail processing cycle.
Figure 3B:
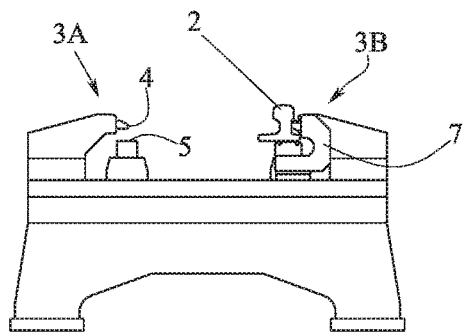
Figure 4E:
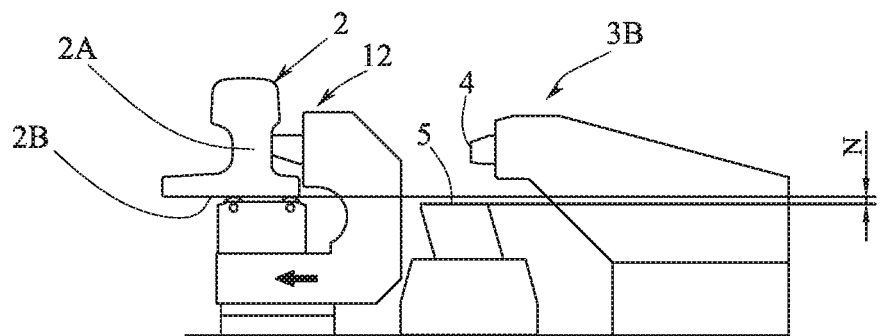
FIGS. 4A to 4E show, in sequence, various operating steps relating to the device in FIG. 1.
Figure 4D:
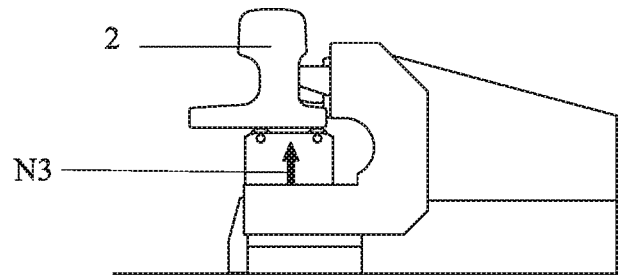
Figure 4C:
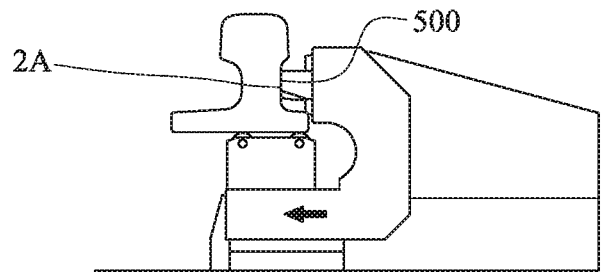
Figure 4B:
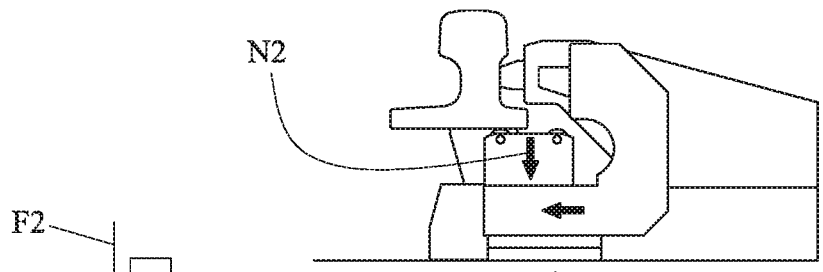
Figure 4A:
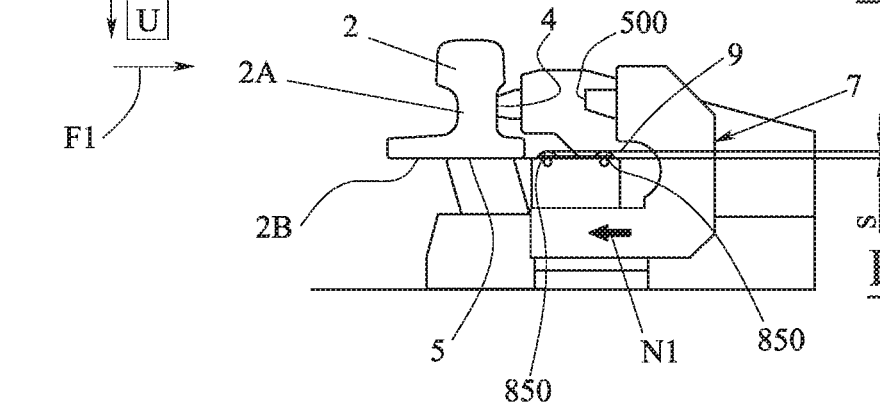
Figure 5:
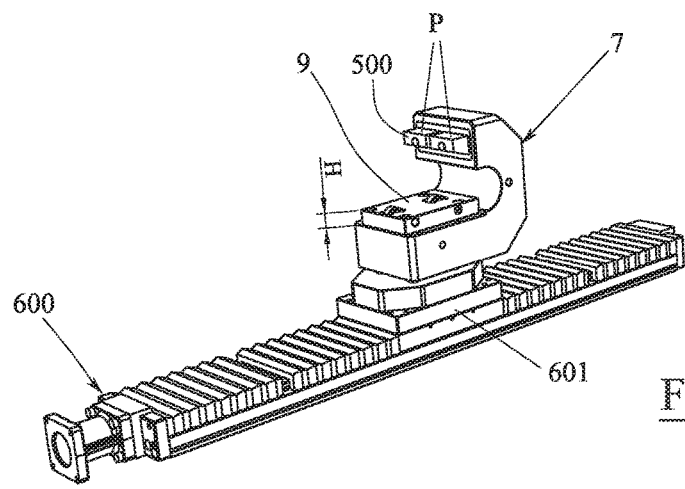
FIG. 5 is a simplified perspective view of a transport system in the device in FIG. 1.

As can be seen in FIGS. 4E and 4A, which provide a more detailed view of the second work station 3B, a second magnetic anchorage plane 5 is also provided, which is configured to cooperate with a foot 2B of the rail when the latter is being processed. The first work station also comprises an essentially identical magnetic anchorage plane 5 (see, for example, FIG. 3A). It should be noted that the second anchorage plane 5 of the first 3A and the second work station 3B are coplanar.

The first magnetic anchorage plane 4 and the second 5 are simply schematised in the figures in the present description, and may comprise a plurality of magnetic polar units P in a reciprocal, side-by-side arrangement, the free ends of which define the anchorage plane.

Advantageously, the first 4 and the second magnetic plane are equipped with anchorage surfaces positioned in a mutually orthogonally manner.

In one possible configuration, the anchorage planes may be of the electropermanent type.

Figure 8:
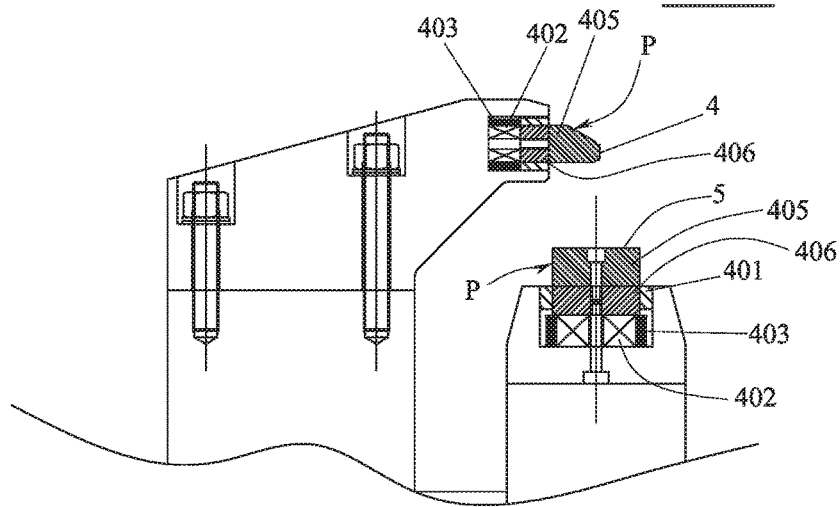
FIG. 8 is a partially sectioned view of anchorage planes in the device in FIG. 1.

Each polar unit P of the electropermanent anchorage plane may comprise a pole 406 (see FIG. 8) made of a ferromagnetic material, the perimeter of which is delimited by permanent magnets 401 (for example, neodymium magnets). The polar unit P may further comprise a polar expansion 405, also made of a ferromagnetic material and associated to the pole 406 (for example, by means of one or more screws).

An invertible magnet 402 (for example, AlNiCo) may be provided, associated to the pole 406 (for example on the opposite side with respect to the free surface of the polar expansion). Around the invertible magnet there may be a coil 403, which inverts the magnetic field thereof.

The invertible magnet generates a magnetic flux equal to that of permanent magnets. When the flux of the invertible magnet is added to that of the permanent magnets, the anchorage surface of the polar unit is magnetised. When the coil inverts the flux of the invertible magnet, the field thereof and of the permanent magnets is removed, thereby demagnetising the anchorage surface.

In this way, it is possible to magnetise or demagnetise the anchorage planes by providing them with a current solely during the inversion phase of the invertible magnet.

According to one aspect of the present invention, the rail transport system 50A may comprise at least one shuttle (7) which is translatable between the first and the second work station 3A, 3B.

The shuttle 7 may be mounted (for the translation thereof) on a linear motion system 600 (linear motion slides), for example, of the type produced by Rexroth known with the initials TKK.

The shuttle 7 may comprise at least one locking apparatus 12 to secure the rail 2 during transport from one station to the other. In the configuration illustrated, the locking apparatus is a further magnetic anchorage plane 500 which is functionally and structurally similar to the first 4 and the second magnetic anchorage plane 5 described above.

The transport system 50A and, advantageously, the said shuttle 7, may also comprise a lifter 8 arranged to lift the rail 2 off the second magnetic anchorage plane 5 when the latter is deactivated.

Figures 6, 7:
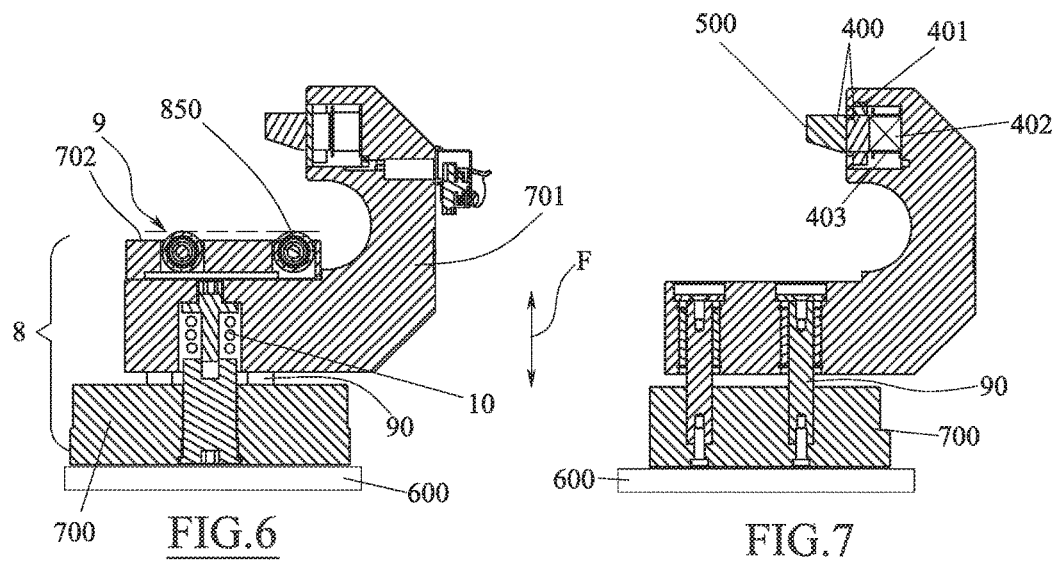
FIG. 6 is a partial, simplified section taken along line VI-VI of FIG. 2.
FIG. 7 is a partial, simplified section taken along line VII of FIG. 2.

In one possible configuration (see FIGS. 6 and 7), the lift 8 may comprise a rail support surface 9 supported by at least one elastic element 10.

The support surface is also supported by at least one guide element 90 (but in this case there are four), for example of the type featuring a bush.

More specifically, the shuttle 7 may be formed of a base 700 fixed to a slide 601 in the linear motion system 600. By means of the elastic element 10 and the guide elements 90, the base 700 may support a shaped body 701 which is vertically mobile (F arrows) with respect to the said base 700. In the case described, the shaped body 701 is C-shaped.

The said body may support the further magnetic anchorage plane 500, positioned, for example, at one end of a branch of the C. The further anchorage plane 500 as illustrated shows two polar units P, but this number is purely exemplificative. The shaped body 701 may also support an adapter 702. The adapter 702 may be secured to the shaped body 701 in a removable manner, and is interchangeable to meet requirements. Essentially, several adapters with different heights H may be provided in order to adapt the system to the processing of rails 2 with different heights.

In any case, a free surface of the adapter may delimit a support plane 9 to hold the rail 2.

The support surface 9 and the elastic element 10 may be configured in such a way that, when the support surface 9 is empty, a contact surface 9A thereof is slightly raised (by S) with respect to the support surface of the second magnetic anchorage plane 5 (see FIG. 4A).

The utility of the shuttle 7 described above is evident from FIGS. 4A-4E, in which a possible operation thereof is illustrated.

In FIG. 4A, the shuttle 7 is in a resting position, in which the said shuttle does not cooperate with the rail 2 being worked on in the second work station 3B.

In this configuration, the first anchorage plane 4 and the second anchorage plane 5 are magnetised and the rail 2 is held firmly in position. In this configuration, the tool U can process the surfaces of the rail 2 and, in particular, those distant from the anchorage plane 4. As can be seen, the rail 2 is particularly stable, especially in response to forces exerted by the tool in the direction of the arrow F1 or in the direction of the arrow F2. Indeed, said forces are effectively countered by the first anchorage plane 4 and the second anchorage plane 5.

When it is necessary to process the rail 2 on the surfaces opposite those processed in the second work station 3B (thus generating forces in the opposite direction to that of the arrow F1), the shuttle 7 moves the rail 2 from one work station to the other (in this case to the first station 3A, but it must be emphasised that, in the present text, references to the first or second work station have no temporal relevance with respect to the processing carried out on the rail).

Movement of the rail 2 may also take place when processing is necessary on parts not accessible to the tool when the rail 2 is in a work station, such as—for example—the right side (in FIG. 4A) of the foot of the rail.

The rail may be moved as described below.

Starting from the position in FIG. 4A, the shuttle moves in the direction of the arrow N1.

In this configuration, the first anchorage plane 4 and the second anchorage plane 5 are active and the support surface 9 (lowering in the direction of the arrow N2, FIG. 4b) wedges underneath the rail 2, consequently compressing the elastic element 10.

Advantageously, to facilitate wedging, the support surface 9 comprises at least one rolling element 850, which defines the contact surface of the support surface 9, which is provided to facilitate the sliding of the latter underneath the rail 2. Alternatively to the rolling element, an inclined surface or other functionally similar element may be featured.

Once the shuttle 7 is in the position shown in FIG. 4C (i.e. with the further anchorage surface 500 abutting against the web 2A of the rail 2), the further anchorage surface 500 is magnetised. At this point, the first 4 and the second magnetic anchorage plane 5 are deactivated.

The elastic element 10, configured to allow at least partial raising of the rail 2, raises the support plane 9 (and consequently the rail) off the second anchorage plane 5 (by N).

Since the further magnetic plane 500 is supported by the lift 8, the former is consequently raised together with the support surface 9.

Obviously the force exerted by the elastic element 10 (or rather by all elastic elements of all the shuttles 7 equipped on the device 1 and acting on the rail 2) is calibrated so as to allow the rail 2 to be raised off the second anchorage plane 5, along the entire length thereof.

Figure 3C:
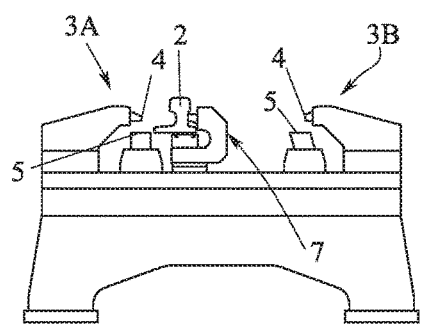

Once the raising of the rail 2 is complete, the shuttle (or shuttles) 7 can move towards the first work station 3A (FIG. 3C).

Figure 3D:
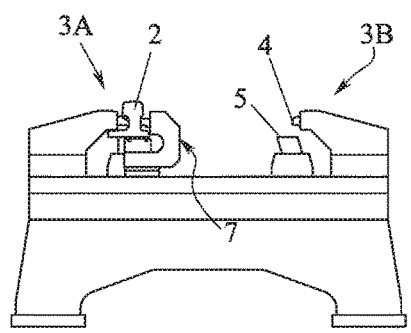
Figure 3E:
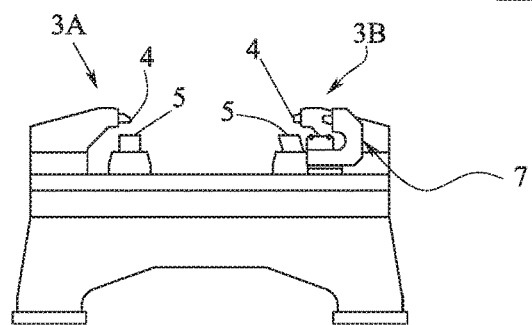

The movement of the shuttle 7 continues until the rail web is abutting (FIG. 3D) against the first anchorage plane 4 of the first work station 3A.

The second anchorage plane 5 and the first anchorage plane 4 of the first work station 3A are subsequently activated and the further anchorage plane 500 of the shuttle 7 is subsequently deactivated. The shuttle 7 subsequently moves away from the first station 3A, into the parking position.

The rail 2 can then be processed by the tool U, which may also exert considerable force in the opposite direction to that of the arrow F1, which will be absorbed by the first anchorage plane 4 of the first work station 3A.

The device described above maintains all the advantages of the current magnetic systems (processing chip evacuation, cleaning, uniform anchorage). Furthermore, the presence of two mutually facing magnetic systems rigidly connected to the base frame allows the forces generated by the tool driving against the rail to be released via an abutment surface connected to the machine tool base, thus improving mechanical processing stability and speed.

Movement of the rail 2 being processed between the two mutually opposite magnetic systems associated to the first work station and the second work station, is guaranteed by a magnetic shuttle 7 equipped with polar units and elastic systems which allow vertical movement thereof.

The elastic system is a particularly advantageous solution since it is not necessary to equip the shuttle with a dedicated vertical drive (for raising the rail 2 off the second magnetic anchorage planes 5).

It should however be noted that, instead of the spring and the guides described, it is also possible to provide a dedicated drive which raises the rail from the magnetic anchorage planes, for example, performed by pneumatic or hydraulic cylinders, or another electrical or magnetic system.

Obviously, all the system control systems may be managed automatically by a control unit, or manually by means of simple switches that activate and deactivate the magnetic plane and shuttle drive procedures.

In the event that a system automation is present, it is possible to integrate control of device 1, as described above, with the numerical control system of the tool U, so as to create an essentially automatic machine which processes a single rail with a considerable degree of accuracy and with a high cutting speed.

Figure 9:
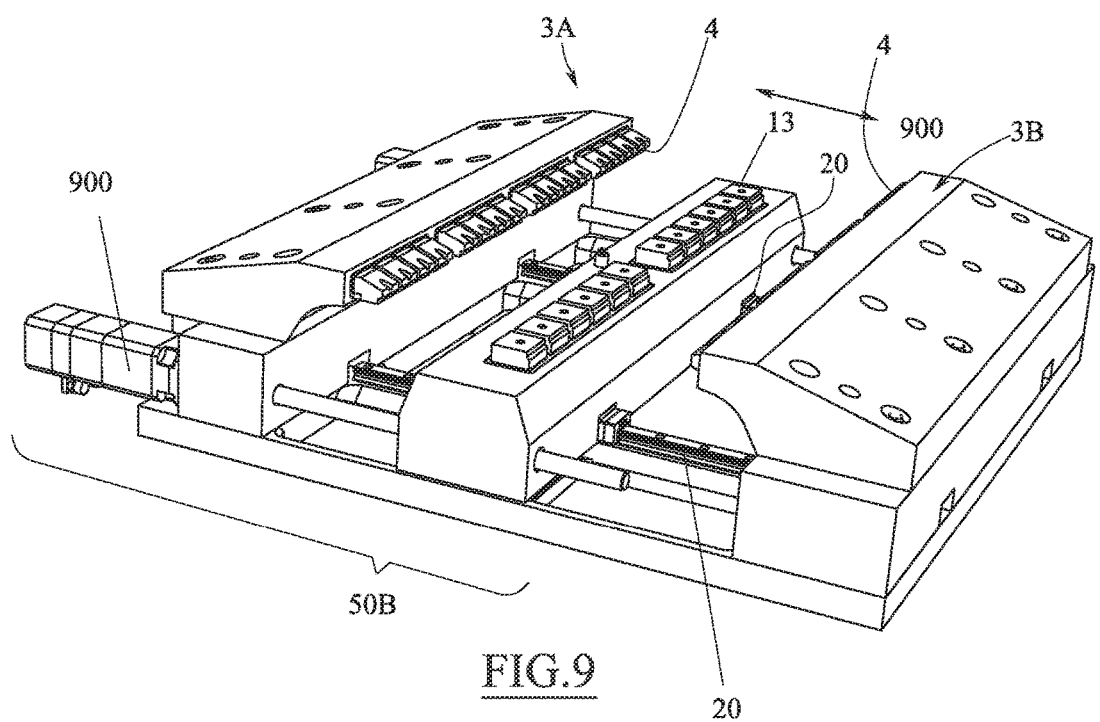
FIG. 9 is a perspective view of an alternative embodiment of the invention in FIG. 1.

One possible alternative embodiment of the invention is shown in FIG. 9, in which the same reference numbers used earlier are used to denote parts that are functionally identical to the part already described.

As can be seen in the figure, the device 9 also features a first work station 3A and a second work station 3B, each equipped with a first magnetic anchorage plane 4 configured to cooperate with the web of the rail 2 being processed.

In this case, however, neither of the work stations comprises a second magnetic anchorage plane 5. Indeed, solely one second magnetic anchorage plane 13 is envisaged for both work stations. The said plane is slidably mounted on guides 20 featured between the first work station 3A and the second 3B, and is associated with actuators 900 (for example electric actuators with ball screws designed to move the said plane between the first work station 3A and the second 3B.

Indeed, the transport system 50B in this embodiment consists of the support/anchorage surface of the rail 2 being processed, which moves when necessary between the first or second work station (and vice versa).

Obviously also in this case, a tool is envisaged (not shown here but essentially identical to that described earlier) for the processing of the rail, which releases the cutting forces via the first anchorage surface 4 of one or the other work station.

The present invention also relates to a method of processing a rail 2, which may also be carried out by means of the devices described above, comprising the following steps:

a. magnetically locking at least a web 2A and a foot 2B of a rail in a first work station 3A and processing, with a tool U, a part of the rail 2, b. unlocking at least the web 2A of the rail from the first work station 3A and moving the rail to a second work station 3B, facing the first, c. magnetically locking at least the web 2A of the rail onto the surface opposite that onto which the said web was locked in the first work station 3A and d. processing a second part of the rail 2.

In particular, in the first work station 3A and in the second 3B, the foot 2B of the rail can be magnetically locked with two independent magnetic anchorage planes 5, each being provided in the respective work station.

Furthermore, the rail can be moved from one work station to another by means of at least one shuttle 7.

It is also possible to raise the rail 2 elastically off the second magnetic planes 5 when the latter are deactivated.

In a different embodiment, to move the rail 2 from the first to the second work station and vice versa, a second magnetic anchorage plane 13, which locks the foot of the rail 2, may be moved from the first to the second workstation and vice versa.

Various embodiments of the innovation have been disclosed herein, but further embodiments may also be conceived using the same innovative concept.

The invention claimed is:

1. Rail processing device (1) comprising at least a first (3A) and a second work station (3B) provided on a common frame (30), the first and the second work station being configured to alternately hold a rail (2) when the rail is being processed, each work station (3A, 3B) comprising at least a respective first magnetic anchorage device, each first magnetic anchorage device comprising a respective planar anchorage surface (4) configured to cooperate with a web (2A) of a rail (2) when the rail is being processed in the respective one of the work stations, and the rail processing device further comprising a transport system (50A, 50B) for transporting the rail (2) from the first magnetic anchorage device of the first work station (3A) to the first magnetic anchorage device of the second work station (3B) and vice versa, the transport system (50A, 50B) comprising at least one shuttle translatable between the first (3A) and the second (3B) work station, the at least one shuttle having at least one locking apparatus for locking the rail (2) during transport of the rail from the first work station (3A) to the second work station (3B) and vice versa.

2. Device according to claim 1, wherein each work station (3A, 3B) comprises a respective second magnetic anchorage device comprising a respective planar anchorage surface (5), configured to cooperate with a foot (2B) of the rail when the rail is being processed.

3. Device according to claim 2, wherein the transport system (50A) comprises a lifter (8) arranged to lift the rail from the corresponding second magnetic anchorage device (5) when the latter is turned off.

4. Device according to the claim 3, wherein the lifter (8) comprises a support surface (9) for supporting the rail (2), which support surface (9) is supported by at least one elastic element (10), the support surface and the elastic element being configured in such a way that, when the support surface (9) is empty, the support surface is raised with respect to the planar anchorage surface (5) of the second magnetic anchorage device, so that a movement of the at least one shuttle towards the rail when the second magnetic anchorage device is active, allows the wedging of the support surface (9) below the foot of the rail, resulting in compression of the elastic element (10), the elastic element being configured to allow at least a partial lifting of the rail (2) when the support surface (9) is placed at the bottom of the latter and when the first and second anchorage devices are turned off.

5. Device according to claim 4, wherein the support surface (9) is a top surface (9A) comprising at least one rolling element which may help the wedging of the support surface (9) below the foot of the rail (2).

6. Device according to claim 2, wherein the planar anchorage surface (4) of the first magnetic anchorage device of the first work station (3A) is positioned orthogonal to the planar anchorage surface (5) of the second magnetic anchorage device of the first work station (3A), and wherein the planar anchorage surface (4) of the first magnetic anchorage device of the second work station (3B) is positioned orthogonal to the planar anchorage surface (5) of the second magnetic anchorage device of the second work station (3B).

7. Device according to claim 1, wherein the at least one shuttle (7) comprises a base (700) fixed to a slide (601).

8. Device according to claim 1, wherein the at least one locking apparatus (12) comprises a further magnetic anchorage device comprising a further planar anchorage surface (500, 13).

9. Device according to claim 8, wherein the further planar anchorage device is configured to cooperate with the web (2A) of the rail (2) when the rail is supported by the at least one shuttle.

10. Device according to claim 1, wherein the first (3A) and the second work station (3B) are positioned on the device (1) so that the respective planar anchorage surfaces (4) of the first (3A) and second (3B) work stations face each other.

11. Device according to claim 1, wherein the at least one locking apparatus of the transport system (50B) comprises a second magnetic anchorage device comprising a planar anchorage surface (13) configured to cooperate with a foot (2B) of the rail (2), the second planar anchorage surface (13) being provided to the at least one shuttle, the at least one shuttle being slidably mounted on guides (20) provided between the first (3A) and the second work station (3B), and the at least one shuttle being associated with actuators suitable to move the at least one shuttle between the first and the second work station.

12. Device according to claim 1, wherein each of the first magnetic anchorage devices comprises a respective electromagnet and a respective permanent magnet.

13. Method of processing a rail (2) comprising the steps of:
a. providing the rail processing device (1) according to claim 1,
b. magnetically holding at least a web (2A) and a foot (2B) of the rail in the first work station (3A), and working a part of the rail (2) with a tool (U),
c. unlocking at least the web (2A) of the rail from the first work station (3A) and moving the rail to the second work station (3B),
d. magnetically holding at least the web (2A) of the rail via a surface of the rail opposite to that via which the rail was held when the rail was in the first work station (3A) and
e. working a second part of the rail (2).

14. Method according to claim 13, wherein in each of the first (3A) and the second work stations (3B), the foot (2B) of the rail is magnetically locked via a respective independently-operated second magnetic anchorage device comprising a respective planar anchorage surface (5).

15. Method according to claim 14, wherein the at least one shuttle elastically raises the rail (2) from a respective one of the planar anchorage surfaces (5) of one of the second magnetic anchorage devices when the second magnetic anchorage devices are turned off.

16. Method according to the claim 13, wherein the rail is moved from one of the first and the second work stations to the other of the second and first work stations via the at least one shuttle (7).

17. Method according to claim 13, wherein the at least one locking apparatus comprises a magnetic anchorage surface (13) which locks a flange of the rail, and wherein to move the rail (2) from the first to the second work station and vice versa, the magnetic anchorage surface (13) is moved from the first to the second workstation and vice versa.

* * * * *